United States Patent
Lekas

(10) Patent No.: US 9,842,310 B2
(45) Date of Patent: Dec. 12, 2017

(54) INVENTORYING ITEMS USING IMAGE DATA

(71) Applicant: Esurance Insurance Services, Inc., San Francisco, CA (US)

(72) Inventor: Stephen Nicholas Lekas, San Francisco, CA (US)

(73) Assignee: Esurance Insurance Services, Inc., San Francisco, CA (US)

(*) Notice: Subject to any disclaimer, the term of this patent is extended or adjusted under 35 U.S.C. 154(b) by 0 days.

(21) Appl. No.: 14/331,085

(22) Filed: Jul. 14, 2014

(65) Prior Publication Data

US 2015/0026019 A1 Jan. 22, 2015

Related U.S. Application Data

(60) Provisional application No. 61/847,048, filed on Jul. 16, 2013.

(51) Int. Cl.
  *G06Q 10/08* (2012.01)
(52) U.S. Cl.
  CPC ................. *G06Q 10/087* (2013.01)
(58) Field of Classification Search
  CPC ......... G06Q 10/087; G06Q 10/08; G06K 9/46
  USPC ................. 705/28, 4, 26, 26.81, 35
  See application file for complete search history.

(56) References Cited

U.S. PATENT DOCUMENTS

| | | | | |
|---|---|---|---|---|
| 6,064,980 | A * | 5/2000 | Jacobi | G06Q 30/06 705/1.1 |
| 6,266,649 | B1 * | 7/2001 | Linden | G06Q 10/08345 705/14.51 |
| 7,346,562 | B2 * | 3/2008 | Inoue et al. | 705/26.81 |
| 7,359,873 | B2 * | 4/2008 | Roberts | G06Q 10/087 705/14.1 |
| 7,685,022 | B1 * | 3/2010 | Heyworth et al. | 705/26.8 |
| 8,069,096 | B1 * | 11/2011 | Ballaro et al. | 705/27.2 |
| 8,442,887 | B2 * | 5/2013 | Hamann | 705/35 |
| 8,904,493 | B1 * | 12/2014 | Dibble | 726/4 |
| 2002/0087426 | A1 * | 7/2002 | Shiitani et al. | 705/26 |
| 2006/0069623 | A1 * | 3/2006 | MacDonald Korth | G06Q 30/08 705/26.1 |
| 2007/0060099 | A1 * | 3/2007 | Ramer | G06F 17/30867 455/405 |
| 2008/0300973 | A1 * | 12/2008 | DeWitt | G06Q 10/08 705/14.21 |
| 2009/0106108 | A1 * | 4/2009 | Ku | G06Q 30/0256 705/14.54 |
| 2010/0088238 | A1 * | 4/2010 | Butterfield | 705/80 |
| 2011/0161117 | A1 * | 6/2011 | Busque et al. | 705/4 |
| 2012/0158516 | A1 * | 6/2012 | Wooten et al. | 705/14.66 |

(Continued)

*Primary Examiner* — Vanel Frenel
(74) *Attorney, Agent, or Firm* — Mintz Levin Cohn Ferris Glovsky and Popeo, P.C.

(57) ABSTRACT

A method, system and computer-readable medium are provided for generating and maintaining a catalog of belongings for a user. The method includes the steps of receiving image data from a user, the image data containing images of one or more items of belonging; identifying one or more items from the image data, determining information regarding the identified one or more items, and adding at least one of the identified one or more items and information regarding the at least one of the identified one or more items to a catalog of belonging for the user.

19 Claims, 4 Drawing Sheets

(56) References Cited

U.S. PATENT DOCUMENTS

2014/0215552 A1\* 7/2014 Abnous et al. .................. 726/1
2014/0257862 A1\* 9/2014 Billman ................ G06Q 40/08
705/4

\* cited by examiner

INVENTORYING ITEMS USING IMAGE DATA

CROSS-REFERENCE TO RELATED APPLICATION

The present application claims the benefit of U.S. Provisional Patent Application Ser. No. 61/847,048, entitled "Inventorying Items Using Image Data," filed on Jul. 16, 2013, which is hereby incorporated by reference in its entirety for all purposes.

BACKGROUND

Field

The present disclosure generally relates to insurance services, and more particularly to image processing for inventorying items.

Description of the Related Art

Personal property indexing services are available that assist a user in inventorying their belongings so that a record of these belongings exists in the event of a loss pursued in an insurance claim. Unfortunately, very few people use the indexing services due to the tedium associated with individually cataloging each and every belonging owned, and thereafter maintaining that catalog.

SUMMARY

The disclosed system and method describe a method facilitating automatic generation and maintenance of a catalogue of user belongings. In certain embodiments, a method is provided for generating and maintaining a catalogue of belongings for a user. The method includes the steps of receiving image data from a user, the image data containing images of one or more items of belonging. The method may further include identifying one or more items from the image data. The method may further include determining information regarding the identified one or more items. The method may further include adding at least one of the identified one or more items and information regarding the at least one of the identified one or more items to a catalogue of belonging for the user, the catalogue of belongings.

In certain embodiments, a system for generating and maintaining a catalogue of belongings for a user is provided. The system may include one or more processors and a machine-readable medium including instructions stored therein, which when executed by the processors, cause the processors to perform operations including receiving image data from a user, the image data containing images of one or more items of belonging located within a dwelling of the user. The operations may further include identifying one or more items from the image data. The operations may further include determining if the user is associated with a catalogue of belongings. The operations may further include generating a catalogue of belongings for the user associated with the dwelling when the user is not associated with a catalogue of belongings. The operations may further include adding the one or more items to the generated catalogue.

In certain embodiments, a non-transitory computer-readable medium having computer-executable instructions stored thereon for execution by a processor to perform a method generating and maintaining a catalogue of belongings for a user is provided. The method may include receiving image data captured including items within a dwelling of a user. The method may further include identifying one or more items from the image data. The method may further include validating the one or more items by comparing a location of the image data with a location of the dwelling. The method may further include identifying a catalogue of belongings associated with the user for cataloguing items within the dwelling of the user. The method may further include updating the catalogue of belongings according to the identified one or more items, such that the catalogue of belongings stores information for each item captured within the received image data, wherein the updating includes one of adding, deleting or updating items stored within the catalogue of belongings.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent that the subject technology is not limited to the specific details set forth herein and may be practiced without these specific details. In other instances, well-known structures and techniques have not been shown in detail so as not to obscure the disclosure.

Some examples provided herein describe identifying and/or storing user property information. In several examples, identification of such information is performed after the user grants explicit permission for such user information to be identified and stored in memory. Each user may be provided notice that such user information will be stored with such explicit consent from the user. The stored user information may be encrypted to protect user security.

The disclosed system and method facilitate generation and maintenance of a catalogue of personal property or belongings (e.g. contents such as furniture, electronics, home appliances, vehicles, bikes, bicycles, equipment, clothing, etc.) within a user dwelling (e.g., home or place of business). In one example, the inventorying process for identifying and cataloguing user personal belongings is automated. In some examples, one or more images (e.g., images or video) of user belongings are captured within the user dwelling and image recognition is used to process the captured images in order to index objects (or "items") in the images. As such, an automated indexing and generation of a catalogue of personal belongings of a user is provided.

Figure 1:
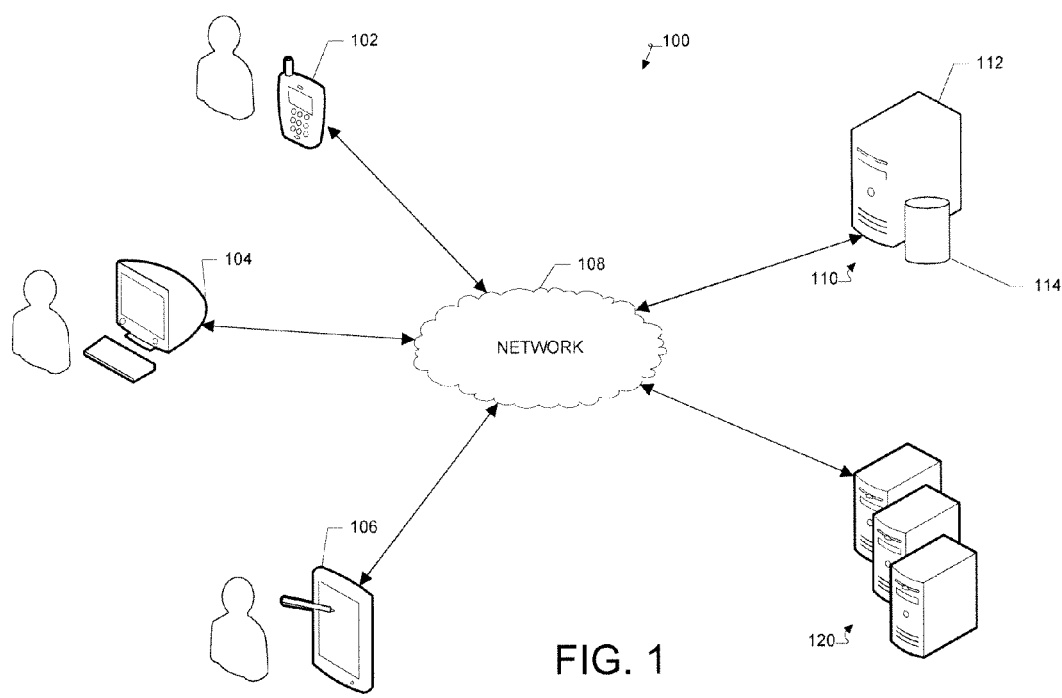
FIG. 1 illustrates an example client-server network environment, which provides for facilitating automatic generation and maintenance of a catalogue of user belongings.

FIG. 1 illustrates an example client-server network environment, which provides for facilitating automatic generation and maintenance of a catalogue of user belongings. A network environment 100 includes a number of electronic devices 102, 104, 106 communicably connected to a server 110 and one or more remote servers 120 by a network 108. Network 108 can be a public communication network (e.g., the Internet, cellular data network, dialup modems over a telephone network) or a private communications network (e.g., private LAN, leased lines). Further, network 108 can include, but is not limited to, any one or more of the following network topologies, including a bus network, a star network, a ring network, a mesh network, a star-bus network, a tree or hierarchical network, and the like.

In some example implementations, electronic devices 102, 104, 106 can be computing devices such as laptop or desktop computers, smartphones, PDAs, portable media players, tablet computers, image capture devices (e.g., camera or glasses), or other appropriate computing devices. In some examples, electronic devices 102, 104, 106 have an image capturing capability. In the example of FIG. 1, electronic device 102 is depicted as a smartphone, electronic device 104 is depicted as a desktop computer and electronic device 106 is depicted as a Personal Digital Assistant (PDA).

In some implementations, server 110 includes a processing device 112 and a data store 114. Processing device 112 executes computer instructions stored in data store 114, for example, to facilitate automatic generation and maintenance of a catalogue of user belongings for users interacting with electronic devices 102, 104, 106. Server 110 may further be in communication with remote servers 120 either through the network 108 or through another network or communication means.

Remote servers 120 may be configured to perform various functionalities and/or storage capabilities described herein with regard to the server 110 either alone or in combination with server 110. Server 110 may maintain or be in communication with image recognition services, location services, and/or one or more financial or commerce applications or retail or financial establishments hosted on one or more remote servers 120.

In some example aspects, server 110 and/or one or more remote servers 120 can be a single computing device such as a computer server. In other implementations, server 110 and/or one or more remote servers 120 can represent more than one computing device working together to perform the actions of a server computer (e.g., cloud computing). Server 110 and/or one or more remote servers 120 may be coupled with various remote databases or storage services. While server 110 and the one or more remote servers 120 are displayed as being remote from one another, it should be understood that the functions performed by these servers may be performed within a single server, or across multiple servers.

Communications between the client devices 102, 104, 106, server 110 and/or one or more remote servers 120 may be facilitated through various communication protocols. In some aspects, client devices 102, 104, 106, server 110 and/or one or more remote servers 120 may communicate wirelessly through a communication interface (not shown), which may include digital signal processing circuitry where necessary. The communication interface may provide for communications under various modes or protocols, including Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, including using a Bluetooth, WiFi, or other such transceiver.

Users may interact with the system hosted by server 110, and/or one or more social networking services hosted by remote servers 120, through a client application installed at the electronic devices 102, 104, 106. Alternatively, the user may interact with the system and the one or more social networking services through a web based browser application at the electronic devices 102, 104, 106. Communication between client devices 102, 104, 106 and the system, and/or one or more social networking services, may be facilitated through a network (e.g., network 108).

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

A user at a client device (e.g., electronic devices 102, 104, 106) may access an application at the client device (e.g., hosted by server 110) and request to create or update a catalogue of belongings. In one example, the user is prompted to generate an account and/or log into an existing account at the application. In one example, the user may capture and input information (e.g., images or other information).

The entered information, in some examples, includes images captured, for example, using the client device or other device and uploaded to the application. In one example, the images may be captured by the user operating the client device. In another example, the user may be prompted to grant access to a live agent to remotely control the application and/or client device in order to capture the images.

In one example, the client device may be configured to enable remote control of certain functions of the client device by a remote agent (e.g., a live agent through audio or video conference). For example, the client application running on the client device may be configured to access various capabilities of the client device and/or capabilities of devices in communication with the client device. For example, the application may have access to one or more cameras on the client device (e.g., a front-facing camera and/or a rear-facing camera), microphones on the client device, or other sensors or components on the device (e.g., an accelerometer, infrared sensors, a global positioning system, a light, etc.). The client application may also provide a way for the agent to access and control the various functions or capabilities through the client device and/or a system (e.g., operating system, or other application system) or processor at the client device.

In some examples, the client device may provide an interface and/or capability for the agent to control certain capabilities of the client device (e.g., remote control). The agent, for example, may request that the client device capture an image, activate a flash when capturing an image, turn on a light on the client device, zoom in the camera, focus the camera, adjust an exposure setting on the camera, or switch a view on a display on the client device.

The switching of the view on the display of the client device may include switching the view to at least one of a view of what a front-facing camera is detecting, a view of what a rear-facing camera is detecting, or a video conferencing view of a remote camera (e.g., a view of a camera at and/or in communication with the client device or a view of the live agent). In additional aspects, switching a view may include changing the display on the client device to a portrait view, a landscape view, or a picture-in-picture view of multiple views.

In response to receiving the captured images, the server 110 may identify one or more items within the captured image using image recognition. In one example, the server 110 may have image recognition capability and/or may be in communication with an image recognition service (e.g., hosted at one or more remote servers 120).

In one example, geographic information embedded in the captured image or otherwise accessible through the image capturing device (e.g., by querying a location service) is retrieved to verify the location of the images being captured. In one example, the user belongings are associated with the user dwelling and the catalogue is generated for insurance purposes. In such examples, the verification of the geographic location of the images as being within the user dwelling allows for a catalogue of users belongings within a dwelling, for example, for future use in case of damage and/or loss. In one example, a list of recognized items from the captured image(s) is provided to the user at the client device. The user may further enter additional information for each item, including for example, date of purchase, any special characteristics such as upgrades or damages to the item, item price, etc. The information is associated with item. In another example, one or more of such information may be automatically retrieved and associated with the item. The one or more items are then added to a catalogue of user belongings.

In some examples, the login information for the user is used at server 110 to determine if the user is associated with an existing list of belongings ("a catalogue"). If so, the one or more items may be compared with the existing items with the catalogue and items may be added to the catalogue and/or existing information regarding items may be updated within the existing catalogue. Otherwise, if the user is not associated with an existing catalogue, the server 110 may generate a catalogue of the items recognized from the user information entered during the session (e.g., from images and/or additional information) and may store the items in association with the user.

Figure 2:
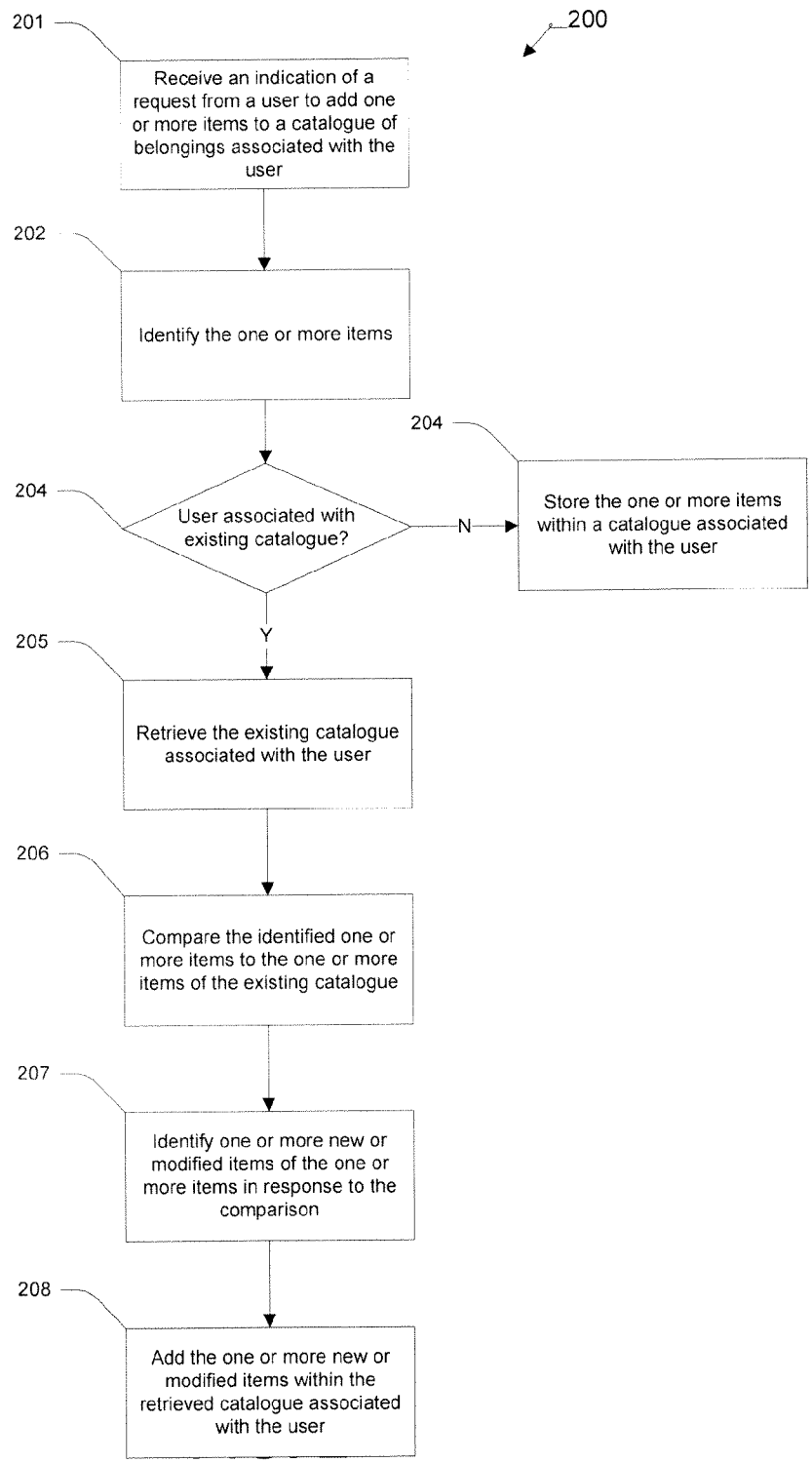
FIG. 2 illustrates an example process for facilitating automatic generation and maintenance of a catalogue of user belongings.

FIG. 2 illustrates an example process 200 for facilitating automatic generation and maintenance of a catalogue of user belongings. In step 201, an indication of a request to add one or more items to a catalogue of belongings associated with a user is received. In one example, the user may capture an image (e.g., still images or video) containing one or more items. In one example, when the user logs into the system, prompts may be provided to the user, to allow the user to capture images of items within different areas of the dwelling to generate a full catalogue of the user belongings. In addition, items may be entered by detecting item purchases by the user (e.g., through detecting purchases at one or more accounts associated with the user account within the system). In yet another example, information regarding items may be entered by scanning or capturing an image of a purchase receipt by the user.

Figure 3:
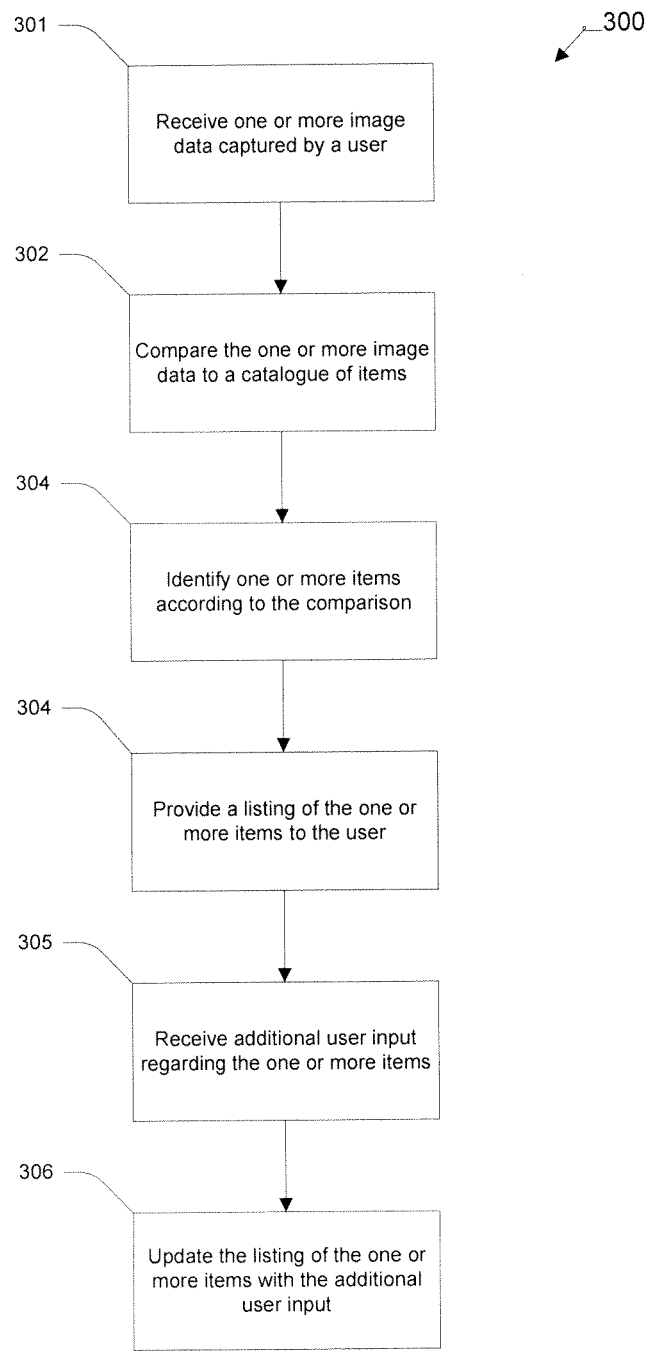
FIG. 3 illustrates an example process for identifying one or more items belonging to a user using images capture information.

Upon receiving the request, in step 202, the one or more items are identified. In one example, where the request include one or more images uploaded to the system, the system may provide the images to an image recognition engine to identify the items within each image. FIG. 3, described in more details below, illustrates an example process for generating a listing of one or more items from one or more image data captured by a user. In one example, the items may also include items received from one or more other services (e.g., purchases detected through accounts linked with the user profile), and/or entered through other means such as scanning in item barcodes or receipts and/or by manually entering the item(s).

In one example, upon identifying one or more items, the user may be prompted to enter additional information regarding the identified items and/or to verify that the identified items are correct. In one example, the items are associated with the corresponding additional information entered by the user.

As described above, once the list of one or more items is identified, the one or more items within the list may be validated, for example, using geographic location information. In one example, images may include geo tags that indicate the location of the images. In one example, the location may be determined using location indicators of the device used to capture the image and/or upload the image to the system. In one example, the location of the images and/or device is compared against the location of the user dwelling to confirm that the items being captured are in fact items within the user dwelling.

In some examples, in addition to object recognition, the system (e.g., and/or one or more applications and/or systems in communication with the system) may further provide a value for each identified item. In some examples, the value of the item may be determined using information from one or more sources. For example, the value may be received as an additional input from the user. Item information may include identifier information such as brand, ID, model, characteristics (e.g., size, type, etc.), purchase date, etc. The item information may be determined through object recognition, a search engine and/or user input. In one example, the value of an item is determined using item information. For example, a search of the item, including the image and/or information regarding the item, may be performed to find same or similar items having a known value. The value of the same or similar item may then be used to associate a value with the item of the one or more items. The value may be adjusted according to information such as date of purchase (e.g., depreciation) and/or damages or improvements of the item. In another example, a time stamp associated with the capture and/or upload of the image may also be used for determining information regarding the item including for example, date of purchase, model, or value of the item.

In step 203, it is determined if the user is associated with an existing catalogue of belongings. If not, in step 204, the one or more items identified in step 202 including information regarding each item are stored as a catalogue in association with the user (e.g., in association with the user profile). Otherwise, the process continues to step 205, and the existing catalogue associated with the user is retrieved. In step 206, the one or more items identified in step 202 are compared to the one or more items of the existing catalogue retrieved in step 205.

In one example, each item of the identified one or more items is compared to the items within the existing catalogue to determine if each of the one or more items is present within the existing catalogue and/or the item and/or information has been modified. In one example, the modification may include additional or modified information being provided regarding the item. In one example, the modification may include a new image of the item being captured and/or information regarding the item being updated according to the captured image (e.g., improvements, damage, etc.).

In step 207, one or more new or modified items of the one or more items identified in step 202 are determined according to the comparison in step 206. In step 208, the one or more new or modified items are added to the existing catalogue associated with the user. In one example, in addition to adding or modifying items within the list, the system may identify one or more items previously included in the existing catalogue of the user which were not identified in step 202 and may remove the items from the existing catalogue of the user.

Generating and maintaining a catalogue in this manner may be beneficial in facilitating a catalogue for each user which may be used for determining an amount of insurance coverage (e.g., contents insurance coverage) and/or for claim purposes in case of loss or damage of property. In one example, since the catalogue is generated and maintained prior to the loss or damage, the time stamp associated with the items being added to a catalogued may be used as evidence that the item was owned by the user. In one example, the catalogue allows for quick claim times as the user may satisfy their duty of providing a full list of belongings by providing the catalogue along with their claim.

FIG. 3 illustrates an example process 300 for identifying one or more items belonging to a user using images capture information. In step 301, one or more image data captured by a user is received. The image data, may, for example include images and/or video captured using an image capture device (e.g., a smart phone, camera, etc.). In one example, as described above, the user may log into the catalogue system and may be prompted to capture images and/or video of the user belongings for cataloguing purposes, one example, the images may be captured for generating and/or updating a catalogue associated with the user.

In step 302, the captured image data is compared to a reference list of items to recognize one or more items within the received image data. In one example, various object recognition techniques may be used to recognize items within each image or video. In one example, step 302 may be performed by sending a request to a remote object recognition engine. In another example, the system may store a reference list of items locally, and object recognition may be performed locally.

Based on the comparison, in step 303, one or more items are identified. In one example, each identified item corresponds to a belonging of the user within the user dwelling (e.g., residence, business or other location where the images have been captured). As described above, location information regarding the image capture data may be determined to validate that each item is present at the dwelling. In one example, for each identified item, the comparison may return various information including brand, ID, model, characteristics (e.g., size, type, etc.), or other identifiers or characteristics of the item. In another example, additional information regarding an item may be retrieved using the image and/or information retrieved according to the object recognition techniques. For example, a value associated with the item may be retrieved. In one example, the object recognition and/or information determination for each item may be performed in real time where information regarding the items is provided to the user after the image data is captured and/or uploaded into the system. In another example, one or more of the identification and/or information retrieval may be performed at a later time and information may be presented to the user as it becomes available.

In one example, the reference list of items may be updated with the recognized image data and item information. In this manner, information regarding captured image data, and corresponding item information may be stored for later use when generating and maintaining catalogues for the user or one or more other users.

In step 304, a listing of one or items identified according to the comparison is provided for display to the user. As described above, the list may include the items recognized from the image data and/or information regarding the items including identifier information, characteristics information and/or value information of the item.

In step 305, the user may enter additional information regarding the item (e.g., notations, descriptions, etc.), including for example, characteristics information, purchase information and/or value information. In one example, the information entered by the user is provided to complete the information fields for each item that were not filled in automatically in response to the image recognition and other information available and/or to supplement such information.

In step 306, the listing of one or more items is updated using the information provided by the user. For example, the user may add one or more items, may modify or add additional information regarding one or more items, or may provide additional information used to modify information regarding the item (e.g., value indications, date of purchase indications, etc.).

In one example, where information regarding the recognized items is available, the system may facilitate providing the information for display to the user in a live manner. For example, in one instance, an augmented reality may be generated where information regarding each item is provided to the user as the user captures images of the item using a device.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
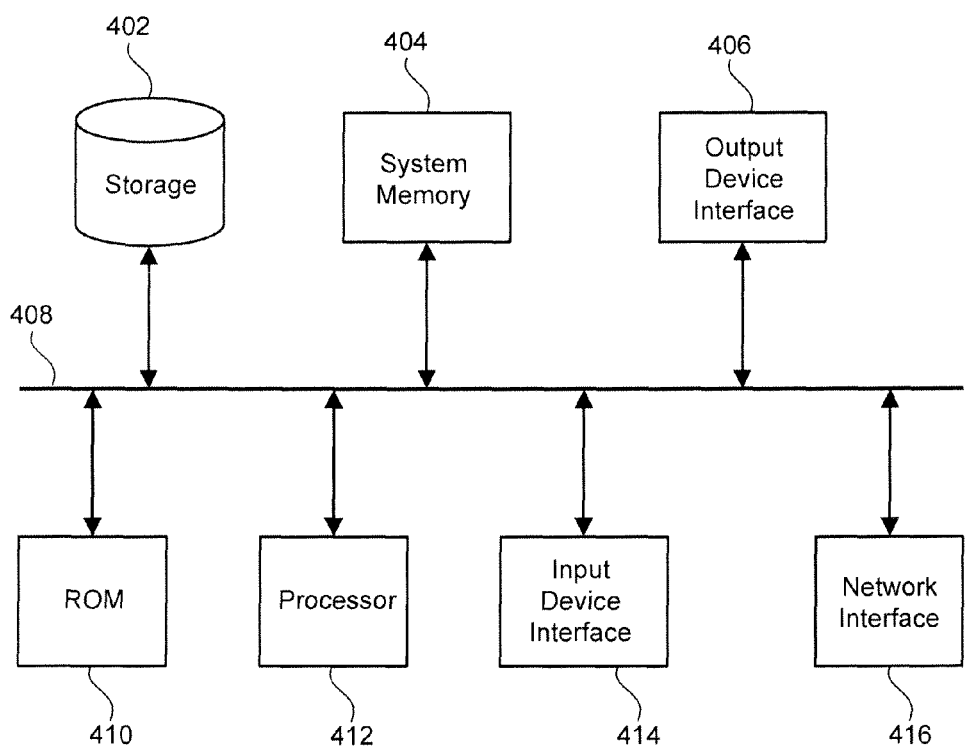
FIG. 4 conceptually illustrates an electronic system with which some implementations of the subject technology are implemented.

FIG. 4 conceptually illustrates an electronic system with which some implementations of the subject technology are implemented. Electronic system 400 can be a server, computer, phone, PDA, laptop, tablet computer, television, image capture devices (e.g., cameras, glasses, etc.), with one or more processors embedded therein or coupled thereto, or any other sort of electronic device. Such an electronic system includes various types of computer readable media and interfaces for various other types of computer readable media. Electronic system 400 includes a bus 408, processing unit(s) 412, a system memory 404, a read-only memory (ROM) 410, a permanent storage device 402, an input device interface 414, an output device interface 406, and a network interface 416.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such a random access memory. System memory 404 stores some of the instructions and data that the processor needs at runtime. In some implementations, the processes of the subject disclosure are stored in system memory 404, permanent storage device 402, and/or ROM 410. For example, the various memory units include instructions for generating and maintaining a catalogue of belongings for a user according to various implementations. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, for example, alphanumeric keyboards and pointing devices (also called "cursor control devices"). Output device interfaces 406 enables, for example, the display of images generated by the electronic system 400. Output devices used with output device interface 406 include, for example, printers and display devices, such as cathode ray tubes (CRT) or liquid crystal displays (LCD). Some implementations include devices such as a touchscreen that functions as both input and output devices.

Finally, as shown in FIG. 4, bus 408 also couples electronic system 400 to a network (not shown) through a network interface 416. In this manner, the computer can be a part of a network of computers (such as a local area network ("LAN"), a wide area network ("WAN"), or an Intranet, or a network of networks, such as the Internet. Any or all components of electronic system 400 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

In the previous detailed description, numerous specific details have been set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 34 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for generating and maintaining a catalogue identifying physical items currently in possession of a user, the method including:
   sending, to a device associated with a user, a request to capture image data that includes at least one image of an interior of a dwelling of the user, the device having a camera configured to capture the image data in response to the request, and the device further having a global positioning system configured to provide a geolocation tag for the image data;
   receiving, from the device from, image data including the at least one image of the interior of the dwelling of the user;
   verifying, at a server, a location where the image data is captured, the verifying being based at least on the geolocation tag associated with the image data;
   processing, at the server and in response to successfully verifying the location, the image data to identify a consumer product item in the image data by at least comparing the image data with reference image data associated with one or more reference items contained in a reference database;
   determining, by the server and in response to the identifying of the consumer product item in the image data, a value of the consumer product item identified in the image data;
   adding, by the server, an identifier and the value of the consumer product item identified in the image data to an item database associated with the user, the item database including identifiers for a plurality of consumer product items currently in possession of the user; and
   subtracting, by the server and in response to not detecting a consumer product item in the image data that has an identifier contained in the item database associated with the user, an identifier and a value for the consumer product item not identified in the image data.

2. The method of claim 1, wherein adding an identifier of the consumer product item identified in the image data includes:
   determining, by the server, whether the user is associated with an item database identifying a plurality of consumer product items currently in possession of the user.

3. The method of claim 2, further including:
   retrieving, by the server, the item database associated with the user;
   comparing the consumer product item identified in the image data with the plurality of consumer product items having identifiers stored in the item database associated with the user; and
   adding, based on the comparison, the identifier for the consumer product item identified in the image data to the item database associated with the user.

4. The method of claim 3, further including:
   determining, based on the comparison, that the consumer product item identified in the image data is a new consumer product item having an identifier not previously stored in the item database associated with the user or a modified consumer product item of the plurality of consumer product items having identifiers stored in the item database associated with the user.

5. The method of claim 2, further including:
   generating, if the user is not associated with an item database, a new item database associated with the user, the new item database associated with the user including identifiers for a plurality of consumer product items currently in possession of the user; and
   adding the identifier for the consumer product item identified in the image data to the new item database associated with the user.

6. The method of claim 1, wherein the item database associated with the user includes information regarding the plurality of consumer product items currently in possession of the user, the information including characteristics information for the plurality of consumer product items, the characteristics information including at least one of, an upgrade, a damage, a price, a size, or a type of the plurality of consumer product items currently in possession of the user.

7. The method of claim 1, further comprising:
   determining a date of purchase, a model, and/or a value of the plurality of consumer product items currently in possession of the user.

8. The method of claim 7, wherein the determining of the at least one of the date of purchase, the model, or the value of the plurality of consumer product items currently in possession of the user includes:
   identifying, by the server and from the reference database, one or more reference items similar to the plurality of consumer product items currently in possession of the user; and
   determining the date of purchase, the model, and/or the value for the plurality of consumer product items currently in possession of the user based on information available regarding the one or more reference items similar to the plurality of consumer product items currently in possession of the user.

9. The method of claim 7, wherein the determining of at least one of the date of purchase, the model, or the value of the plurality of consumer product items in possession of the user comprises:
   providing, to the user, a list of the one or more consumer product items identified in the image data; and
   receiving, from the user, at least the date of purchase, the model, and/or the value of the one or more consumer product items identified in the image data.

10. The method of claim 1, further including:
    receiving, at a server, an indication of a user purchase of a consumer product item;
    identifying, by the server, an identifier of the purchased consumer product item; and
    adding, by the server, the identifier for the purchased consumer product item to the item database associated with the user.

11. The method of claim 10, wherein the indication includes detecting that the consumer product item was purchased based on information from a transaction by a user.

12. The method of claim 10, wherein the indication includes a receipt for the consumer product item being provided by the user.

13. The method of claim 1, further including:
    determining, at the camera, a time associated with a capture of the image data by the camera; and,
    associating, by the camera, the time with the image data.

14. The method of claim 1, wherein the verifying of the location comprise comparing the geolocation tag associated with the image data to a known geographic location associated with the dwelling of the user.

15. The method of claim 1, wherein the value is determined based on at least a date of purchase, a model, and/or a value of the consumer product item identified in the received image data.

16. A system for generating and maintaining a catalogue identifying consumer product items currently in possession of a user, the system including:
one or more processors; and
a machine-readable medium including instructions stored therein, which when executed by the processors, cause the processors to perform operations including:
sending, to a device associated with a user, a request to capture image data that includes at least one image of an interior of a dwelling of the user, the device having a camera configured to capture the image data in response to the request, and the device further having a global positioning system configured to provide a geolocation tag for the image data;
receiving, from the device, image data including the at least one image of the interior of the dwelling of the user;
verifying, at a server, a location where the image data is captured, the verifying being based at least on the geolocation tag associated with the image data;
processing, at the server and in response to successfully verifying the location, the image data to identify a consumer product item in the image data by at least comparing the image data with reference image data associated with one or more reference items contained in a reference database;
determining, by the system and in response to the identifying of the consumer product item in the image data, a value of the consumer product item identified in the image data;
determining, by the system, whether the user is associated with an existing item database that includes identifiers for a plurality of consumer product items currently in possession of the user;
when the user is not associated with an existing item database, generating an item database for the user associated with the dwelling and adding the identifier and the value for the consumer product item identified in the image data to the item database associated with the user; and
when the user is associated with an existing item database, adding the identifier and the value of the consumer product item identified in the image data to the existing item database associated with the user.

17. The system of claim 16, the operations further including:
determining at least one of a date of purchase, a model, or a value of the consumer product item identified in the image data; and
storing, in the existing item database for the user, the determined at least one date of purchase, model, or value of the consumer product item identified in the image data.

18. The system of claim 16, when the user is associated with an existing item database, the operations further including:
comparing the consumer product item identified in the image data to the plurality of consumer product items having identities stored in the existing item database associated with the user; and
updating, based on the comparing, the existing item database associated with the user.

19. A non-transitory computer-readable medium having computer-executable instructions stored thereon for execution by a processor to perform a method, the method including:
sending, to a device associated with a user, a request to capture image data that includes at least one image of an interior of a dwelling of the user, the device having a camera configured to capture the image data in response to the request, and the device further having a global positioning system configured to provide a geolocation tag for the image data;
receiving, from the device, image data including the at least one image of the interior of the dwelling of the user;
verifying, at a server, a location where the image data is captured, the verifying being based at least on the geolocation tag associated with the image data;
processing, at the server and in response to successfully verifying the location, the image data to identify a consumer product item in the image data by at least comparing the image data with reference image data associated with one or more reference items contained in a reference database;
receiving, at the server, location information associated with a location of the camera, the location information being embedded in the image data;
validating the consumer product item by comparing the location information embedded in the image data with a known location of the dwelling;
identifying, by the server, an item database for the user, the item database including identities for a plurality of consumer product items currently in the possession of the user; and
updating, by the server, the item database based on the identifying of the consumer product item identified in the received image data, wherein the updating includes one of adding an identifier of the consumer product item identified in the image data, deleting the identifier of one or more consumer product items of the plurality of consumer product items from the item database for the user, or updating an entry of one or more consumer product items of the plurality of consumer product items having identifiers stored in the item database for the user.

* * * * *